United States Patent
Hsu et al.

(10) Patent No.: US 10,703,365 B1
(45) Date of Patent: Jul. 7, 2020

(54) LANE TRACKING METHOD AND LANE TRACKING SYSTEM FOR AN AUTONOMOUS VEHICLE

(71) Applicant: Automotive Research & Testing Center, Lugong, Changhua County (TW)

(72) Inventors: Jin-Yan Hsu, Changhua County (TW); Chien-Hung Yu, Changhua County (TW); Kun-Lung Ku, Changhua County (TW); Tong-Kai Jhang, Changhua County (TW); Hung-Pang Lin, Changhua County (TW)

(73) Assignee: AUTOMOTIVE RESEARCH & TESTING CENTER, Lugong, Changhua County (TW)

( * ) Notice: Subject to any disclaimer, the term of this patent is extended or adjusted under 35 U.S.C. 154(b) by 70 days.

(21) Appl. No.: 16/232,553

(22) Filed: Dec. 26, 2018

(51) Int. Cl.
| | |
|---|---|
| *B60W 30/12* | (2020.01) |
| *G06K 9/00* | (2006.01) |
| *G08G 1/16* | (2006.01) |
| *G05D 1/02* | (2020.01) |
| *B60W 50/00* | (2006.01) |

(52) U.S. Cl.
CPC ........ *B60W 30/12* (2013.01); *B60W 50/0097* (2013.01); *G05D 1/027* (2013.01); *G05D 1/0246* (2013.01); *G06K 9/00798* (2013.01); *G08G 1/167* (2013.01); *B60W 2520/125* (2013.01); *B60W 2520/14* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 8,494,716 B1* | 7/2013 | Lee | G05D 1/0246 |
| | | | 382/103 |
| 9,884,623 B2 | 2/2018 | Fasola et al. | |
| 9,934,690 B2 | 4/2018 | Kuroda | |
| 10,019,014 B2* | 7/2018 | Prasad | G05D 1/0246 |
| 2006/0100775 A1* | 5/2006 | Michi | B60K 31/0008 |
| | | | 701/400 |
| 2010/0228420 A1* | 9/2010 | Lee | B62D 15/0255 |
| | | | 701/26 |
| 2015/0213318 A1* | 7/2015 | Einecke | G01N 21/94 |
| | | | 382/103 |
| 2015/0213617 A1 | 7/2015 | Kim et al. | |
| 2015/0355641 A1* | 12/2015 | Choi | B60W 30/18163 |
| | | | 701/23 |
| 2017/0097410 A1* | 4/2017 | Liu | G01S 13/726 |
| 2017/0124781 A1* | 5/2017 | Douillard | G08G 1/202 |
| 2017/0193384 A1* | 7/2017 | Mudalige | G08G 1/166 |

(Continued)

*Primary Examiner* — Kaveh Abrishamkar
(74) *Attorney, Agent, or Firm* — Birch, Stewart, Kolasch & Birch, LLP (57) ABSTRACT

A lane tracking method is proposed for use by an autonomous vehicle running on a lane. A future location of the autonomous vehicle that corresponds to a future time point is estimated based on a current location and a measurement result of an inertial measurement unit of the autonomous vehicle. The future location of the autonomous vehicle, and a reference lane line data and a reference past location that correspond to a reference past time point are used to estimate a future lane line data that corresponds to the future time point.

12 Claims, 8 Drawing Sheets

(56) References Cited

U.S. PATENT DOCUMENTS

| | | | |
|---|---|---|---|
| 2019/0025841 A1* | 1/2019 | Haynes | G01C 21/20 |
| 2019/0056743 A1* | 2/2019 | Alesiani | G01C 21/005 |
| 2019/0064823 A1* | 2/2019 | Jiang | B60W 10/20 |
| 2019/0113927 A1* | 4/2019 | Englard | G05D 1/0231 |

* cited by examiner

|  | Reference lane line data piece | | Reference past location data piece | | |
|---|---|---|---|---|---|
| $t_{0-N}$ | Left lane line equation | Right lane line equation | Longitudinal location value | Lateral location value | Azimuth |
| $t_{0-(N-1)}$ | | | Longitudinal location value | Lateral location value | Azimuth |
| ... | | | ... | | |
| $t_{0-1}$ | | | Longitudinal location value | Lateral location value | Azimuth |
| $t_0$ | Left lane line equation | Right lane line equation | Longitudinal location value | Lateral location value | Azimuth |
|  | Estimated lane line data piece | | Current location data piece | | |

| | Reference lane line data piece | | Reference past location data piece | | | Past location data piece | | | Past location data piece | | | Current location data piece | | | Estimated lane line data piece | | Future location data piece | | |
|---|---|---|---|---|---|---|---|---|---|---|---|---|---|---|---|---|---|---|---|
| | Left lane line equation | Right lane line equation | Longitudinal location value | Lateral location value | Azimuth | Longitudinal location value | Lateral location value | Azimuth | Longitudinal location value | Lateral location value | Azimuth | Longitudinal location value | Lateral location value | Azimuth | Left lane line equation | Right lane line equation | Longitudinal location value | Lateral location value | Azimuth |
| $t_{0-N}$ | ● | ● | ● | ● | ● | | | | | | | | | | | | | | |
| $t_{0-(N-1)}$ | | | | | | ● | ● | ● | | | | | | | | | | | |
| ... | | | | | | | | | ... | ... | ... | | | | | | | | |
| $t_{0-1}$ | | | | | | | | | ● | ● | ● | | | | | | | | |
| $t_0$ | | | | | | | | | | | | ● | ● | ● | ● | ● | | | |
| $t_{0+1}$ | | | | | | | | | | | | | | | | | ● | ● | ● |

FIG.5

| | Reference lane line data piece | | Reference past location data piece | | |
|---|---|---|---|---|---|
| | Left lane line equation | Right lane line equation | Longitudinal location value | Lateral location value | Azimuth |
| $t_{0-10}$ | | | | | |
| $t_{0-9}$ | | | Longitudinal location value | Lateral location value | Azimuth |
| | | | Past location data piece | | |
| ... | | | ... | | |
| $t_{0-1}$ | | | Longitudinal location value | Lateral location value | Azimuth |
| | | | Past location data piece | | |
| $t_0$ | Left lane line equation | Right lane line equation | Longitudinal location value | Lateral location value | Azimuth |
| | Estimated lane line data piece | | Current location data piece | | |
| $t_{0+1}$ | | | Longitudinal location value | Lateral location value | Azimuth |
| | | | Future location data piece | | |

FIG.6

| | Reference lane line data piece | | Reference past location data piece | | |
|---|---|---|---|---|---|
| $t_{0-N}$ ($t_{0-10}$) | Left lane line equation | Right lane line equation | Longitudinal location value | Lateral location value | Azimuth |
| $t_{0-(N-1)}$ ($t_{0-9}$) | | | Past location data piece | | |
| | | | Longitudinal location value | Lateral location value | Azimuth |
| ... | | | ... | | |
| $t_{0-1}$ | | | Past location data piece | | |
| | | | Longitudinal location value | Lateral location value | Azimuth |
| $t_0$ | | | Current location data piece | | |
| | | | Longitudinal location value | Lateral location value | Azimuth |
| $t_{0+1}$ | Future lane line data piece (Estimated lane line data piece) | | Future location data piece | | |
| | Left lane line equation | Right lane line equation | Longitudinal location value | Lateral location value | Azimuth |

LANE TRACKING METHOD AND LANE TRACKING SYSTEM FOR AN AUTONOMOUS VEHICLE

FIELD

The disclosure relates to control of an autonomous vehicle, and more particularly to a lane tracking method and a lane tracking system.

BACKGROUND

According to the levels of driving automation that are formulated by SAE International, a higher level of driving automation requires higher robustness and higher reliability for an active control system of an autonomous vehicle.

Limited by the time required for processing images captured by a camera of a lane tracking system, an update frequency for lane detection information is low (e.g., 10-20 Hz), and the lane detection information is hardly truly "real-time" from the perspective of vehicle motion control. For example, the lane detection information, such as lane line/marking information, is usually 100 ms to 200 ms old when provided to a vehicle control system. If a frequency of the vehicle control system controlling operation of the vehicle is limited by, for example, the lower update frequency of the lane detection information, the resolution and the precision of control instructions issued by the vehicle control system may be reduced, and the lane tracking performance may be adversely affected, which is especially evident in road sections with high curvature or when the vehicle is traveling with a larger lateral speed.

In addition, when lane lines/markings have deteriorated, are unclear or even absent, or present abnormal color contrast due to variations in light conditions, conventional lane tracking methods may not provide correct lane line information as normal.

SUMMARY

Therefore, an object of the disclosure is to provide a lane tracking method that can alleviate at least one of the drawbacks of the prior art.

According to the disclosure, the lane tracking method for use by an autonomous vehicle is proposed to be implemented by a processing unit. The processing unit stores, into a storage unit, a reference lane line data piece, a plurality of past location data pieces, and a current location data piece. The reference lane line data piece is generated based on an image of a lane on which the autonomous vehicle is located, the image of the lane being captured at a reference past time point by a lane detection module mounted to the autonomous vehicle. The past location data pieces include a reference past location data piece that corresponds to a vehicle location, which refers to a location of a reference point of the autonomous vehicle relative to the lane, at the reference past time point. The current location data piece corresponds to the vehicle location at a current time point. Each of the past location data piece(s) other than the reference past location data piece corresponds to the vehicle location at a respective one of one or more past time points that are between the reference past time point and the current time point and that are equidistantly separated by a unit time length. Each of the past location data pieces and the current location data piece includes a longitudinal location value, a lateral location value, and an azimuth.

The lane tracking method includes: a) calculating an estimated yaw rate and an estimated lateral acceleration that correspond to the current time point based on an angular speed and an acceleration of the autonomous vehicle which are measured by an inertial measurement unit of the autonomous vehicle at the current time point, and calculating a reference yaw rate and a reference lateral acceleration that correspond to the current time point based on vehicle motion information that is related to a steering wheel and wheels of the autonomous vehicle and that is sensed at the current time point by a motion sensing unit mounted to the autonomous vehicle; b) upon determining that a similarity between the estimated yaw rate and the reference yaw rate is at least a first predetermined confidence level and that a similarity between the estimated lateral acceleration and the reference lateral acceleration is at least a second predetermined confidence level, estimating a longitudinal displacement, a lateral displacement and an azimuth variation that correspond to a time that is the unit time length later than the current time point, based on the estimated yaw rate and the estimated lateral acceleration; c) calculating a future location data piece that corresponds to the vehicle location at a future time point based on the current location data piece, the longitudinal displacement, the lateral displacement and the azimuth variation, and storing the future location data piece in the storage unit, the future location data piece includes a longitudinal location value, a lateral location value and an azimuth; d) calculating a total longitudinal displacement, a total lateral displacement and a total azimuth variation of the autonomous vehicle from the reference past time point to the future time point based on the reference past location data piece and the future location data piece; e) calculating a future lane line data piece based on the reference lane line data piece, the total longitudinal displacement, the total lateral displacement and the total azimuth variation, and storing the future lane line data piece in the storage unit; and f) transmitting the future lane line data piece to a control system for the control system to control lateral motion of the autonomous vehicle based on the future lane line data piece.

Another object of the disclosure is to provide a lane tracking system that can alleviate at least one of the drawbacks of the prior art.

According to the disclosure, the lane tracking system for use by an autonomous vehicle includes a lane detection module, an inertial measurement unit, a motion sensing unit, a storage unit, and a processing unit. The lane detection module is mounted to the autonomous vehicle, and is configured to continuously capture, at a detecting frequency, images of a lane on which of the autonomous vehicle is located, and to generate a lane line data piece for each image captured thereby. The inertial measurement unit is mounted to the autonomous vehicle, and is configured to sense inertia of the autonomous vehicle and generate data of an angular speed and an acceleration of the autonomous vehicle. The motion sensing unit is mounted to the autonomous vehicle, and is configured to sense motion of the autonomous vehicle and motions of a steering wheel and wheels of the autonomous vehicle, and to generate vehicle motion information. The storage unit stores a reference lane line data piece, a plurality of past location data pieces, and a current location data piece. The reference lane line data piece is generated based on an image of the lane captured at a reference past time point by the lane detection module. The past location data pieces include a reference past location data piece that corresponds to a vehicle location, which refers to a location of a reference point of the autonomous vehicle relative to the lane, at the reference past time point. The current location data piece corresponds to the vehicle location at a current time point. Each of the past location data piece(s) other than the reference past location data piece corresponds to the vehicle location at a respective one of one or more past time points that are between the reference past time point and the current time point and that are equidistantly separated by a unit time length. Each of the past location data pieces and the current location data piece includes a longitudinal location value, a lateral location value, and an azimuth. The processing unit is electrically coupled to the lane detection module, the inertial measurement unit, the motion sensing unit and the storage unit, and is configured to (i) calculate an estimated yaw rate and an estimated lateral acceleration that correspond to the current time point based on the angular speed and the acceleration of the autonomous vehicle which are measured by the inertial measurement unit at the current time point, (ii) calculate a reference yaw rate and a reference lateral acceleration that correspond to the current time point based on the vehicle motion information that is related to the steering wheel and the wheels of the autonomous vehicle and that is sensed by the motion sensing unit at the current time point, (iii) estimate, upon determining that a similarity between the estimated yaw rate and the reference yaw rate is at least a first predetermined confidence level and that a similarity between the estimated lateral acceleration and the reference lateral acceleration is at least a second predetermined confidence level, a longitudinal displacement, a lateral displacement and an azimuth variation that correspond to a time that is the unit time length later than the current time point, based on the estimated yaw rate and the estimated lateral acceleration, (iv) calculate a future location data piece that corresponds to the vehicle location at a future time point based on the current location data piece, the longitudinal displacement, the lateral displacement and the azimuth variation, (v) store the future location data piece in the storage unit, wherein the future location data piece includes a longitudinal location value, a lateral location value and an azimuth, (vi) calculate a total longitudinal displacement, a total lateral displacement and a total azimuth variation of the autonomous vehicle from the reference past time point to the future time point based on the reference past location data piece and the future location data piece, (vii) calculate a future lane line data piece based on the reference lane line data piece, the total longitudinal displacement, the total lateral displacement and the total azimuth variation, (viii) store the future lane line data piece in the storage unit, and (ix) transmit the future lane line data piece to a control system for the control system to control lateral motion of the autonomous vehicle based on the future lane line data piece.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
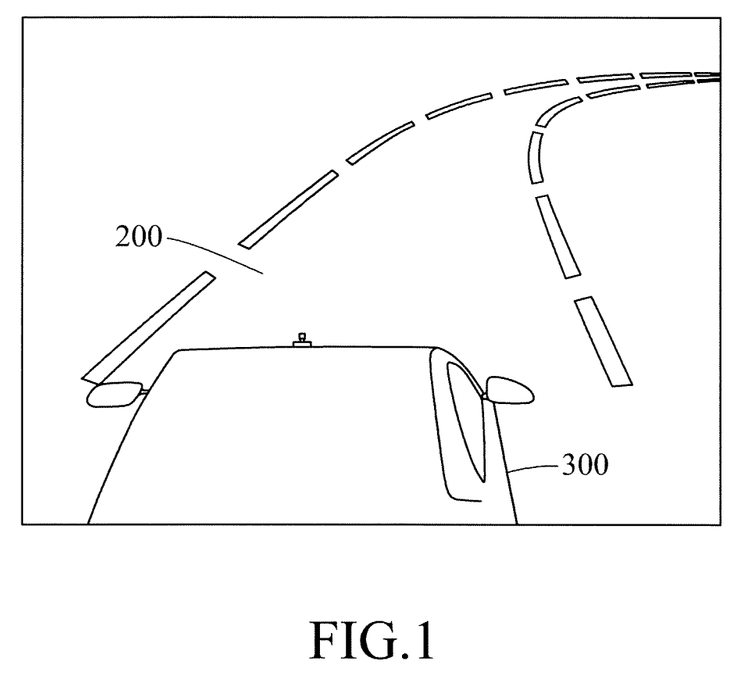
FIG. 1 is a schematic diagram showing a vehicle running on a lane.
Figure 2:
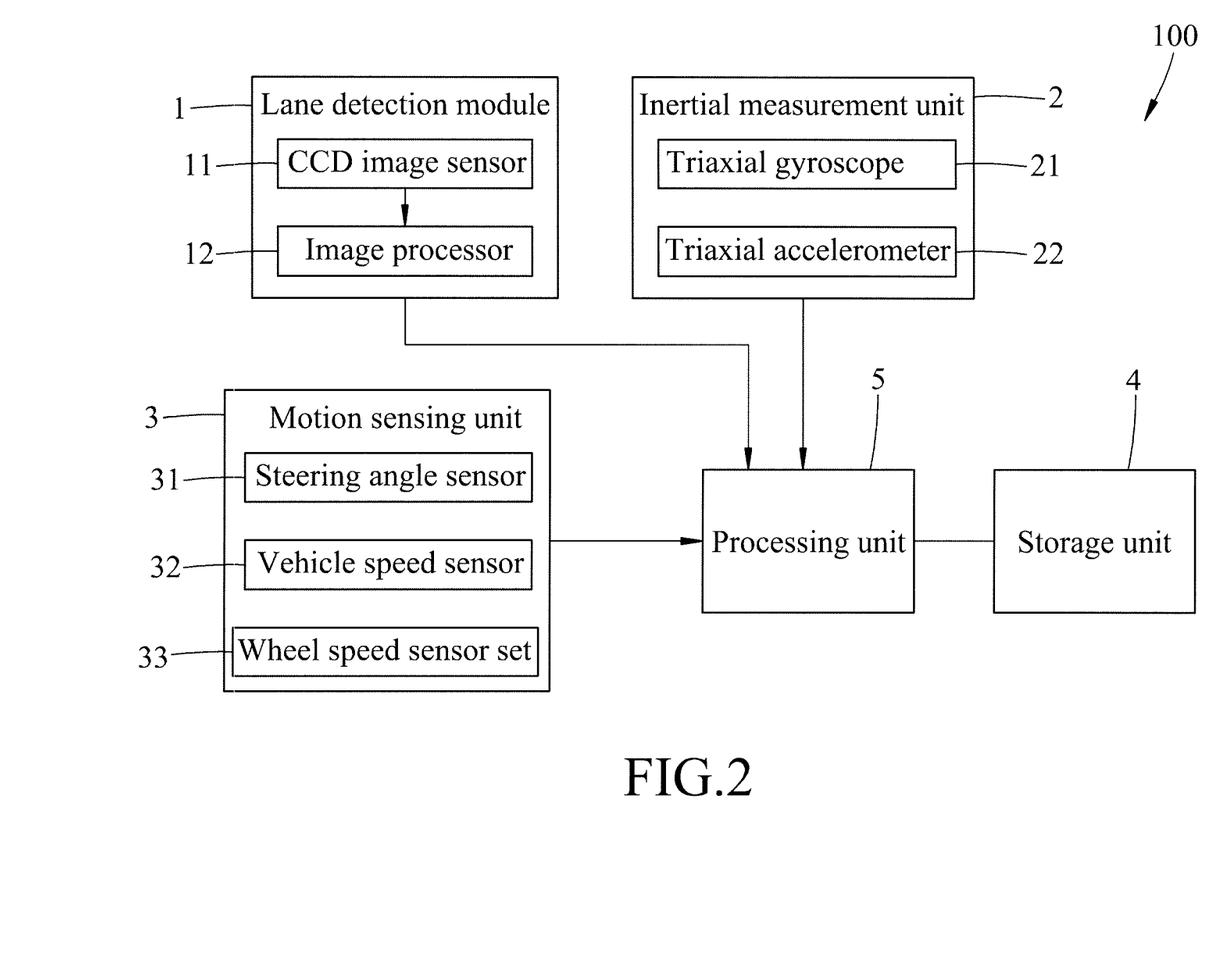
FIG. 2 is a block diagram illustrating an embodiment of the lane tracking system according to this disclosure.

Referring to FIGS. 1 and 2, the embodiment of the lane tracking system 100 according to this disclosure is for use by an autonomous vehicle 300 (i.e., a vehicle capable of driving automation) when the autonomous vehicle 300 is running on a lane 200. In this embodiment, two opposite sides of the lane 200 are marked with lane lines in a form of dashed lines. The lane lines generally refer to lane markings, and in other embodiments, an individual lane line may be formed as a solid line or double solid lines, double broken lines, a solid line beside a broken line, etc., and this disclosure is not limited in this respect. The lane tracking system 100 includes a lane detection module 1, an inertial measurement unit 2, a motion sensing unit 3, a storage unit 4 and a processing unit 5.

Figure 8:
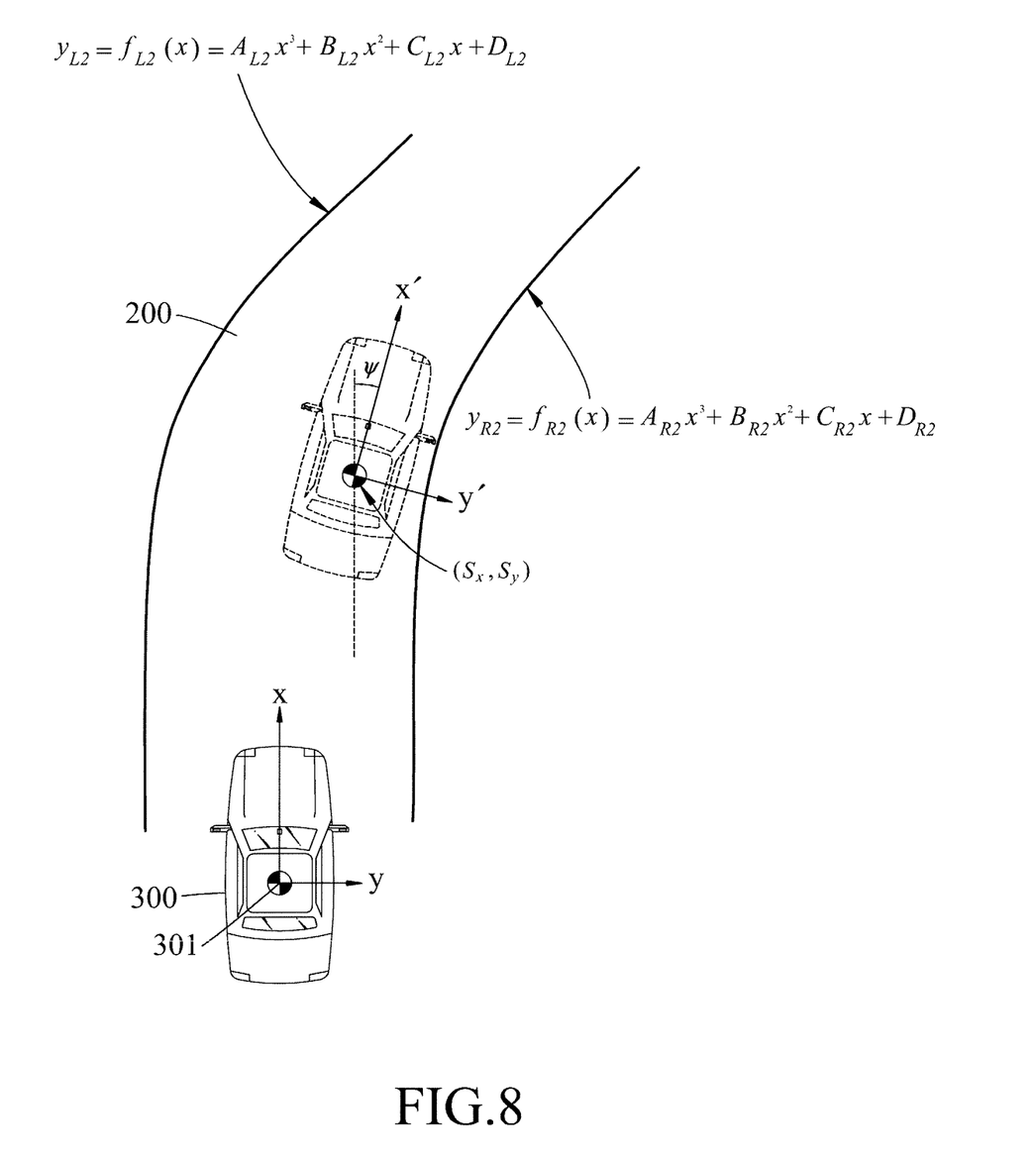
FIG. 8 is a schematic diagram illustrating an estimated future lane line data piece that corresponds to a future time point.

The lane detection module 1 is mounted to the autonomous vehicle 300, and includes, for example, a CCD (charge-coupled device) image sensor 11, and an image processor 12 electrically coupled to the CCD image sensor 11. The CCD image sensor 11 is configured to continuously capture images of the lane 200 at a detecting frequency (e.g., 10 Hz), and the image processor 12 employs conventional image processing algorithms to generate, for each of the images captured by the CCD image sensor 11, a lane line data piece based on the image. An update frequency for the lane line data piece is the same as the detecting frequency (i.e., 10 Hz in this embodiment). Due to time required for image processing, the lane line data piece may be generated and outputted by the image processor 12 100 ms after the corresponding image is captured by the CCD image sensor 11. In this embodiment, the lane line data piece includes, for example, a left lane line equation (equation (1)) and a right lane line equation (equation (2)) in the forms of:

$$y_L = f_L(x) = A_L x^3 + B_L x^2 + C_L x + D_L \quad (1)$$

$$y_R = f_R(x) = A_R x^3 + B_R x^2 + C_R x + D_R \quad (2),$$

where $y_L$ represents a lateral location of a left lane line at a longitudinal location (i.e., a location in a direction where the autonomous vehicle 300 is heading) of x, which is defined with respect to a vehicle location, where the vehicle location refers to a location of a reference point 301 of the autonomous vehicle 300 (see FIG. 8, the reference point 301 may be a center of gravity of the autonomous vehicle 300) relative to the lane 200, and $y_R$ represents a lateral location of a right lane line at the longitudinal location of x.

The inertial measurement unit 2 is mounted to the autonomous vehicle 300, and includes, for example, a triaxial gyroscope 21 and a triaxial accelerometer 22, which are used to measure an angular speed and an acceleration of the autonomous vehicle 300 in the three-dimensional space, and generate inertial measurement results that indicate the angular speed and the acceleration thus measured.

The motion sensing unit 3 is mounted to the autonomous vehicle 300, and is configured to sense motion of the autonomous vehicle 300 and motions of a steering wheel and wheels of the autonomous vehicle 300, and to generate vehicle motion information accordingly. In this embodiment, the motion sensing unit 3 includes a steering angle sensor 31 to sense a steering angle of the steering wheel of the autonomous vehicle 300, a vehicle speed sensor 32 to sense a longitudinal velocity (vehicle speed) of the autonomous vehicle 300, and a wheel speed sensor set 33 to sense rotational speeds (wheel speeds) of the wheels of the autonomous vehicle 300, but this disclosure is not limited in this respect. In this embodiment, the vehicle motion information includes the steering angle, the vehicle speed, the wheel speed of a rear right wheel of the autonomous vehicle 300, and the wheel speed of a rear left wheel of the autonomous vehicle 300.

Ideally, the inertial measurement unit 2 and the motion sensing unit 3 are designed to have the same output refresh rate, which is assumed to be ten times the output refresh rate of the lane detection module 1 in this embodiment. For example, the outputs of the inertial measurement unit 2 and the motion sensing unit 3 are updated every 10 ms, which means that the update frequency (refresh rate) is 100 Hz, and the time length 10 ms is referred to as the unit time length in this example.

Figure 3:
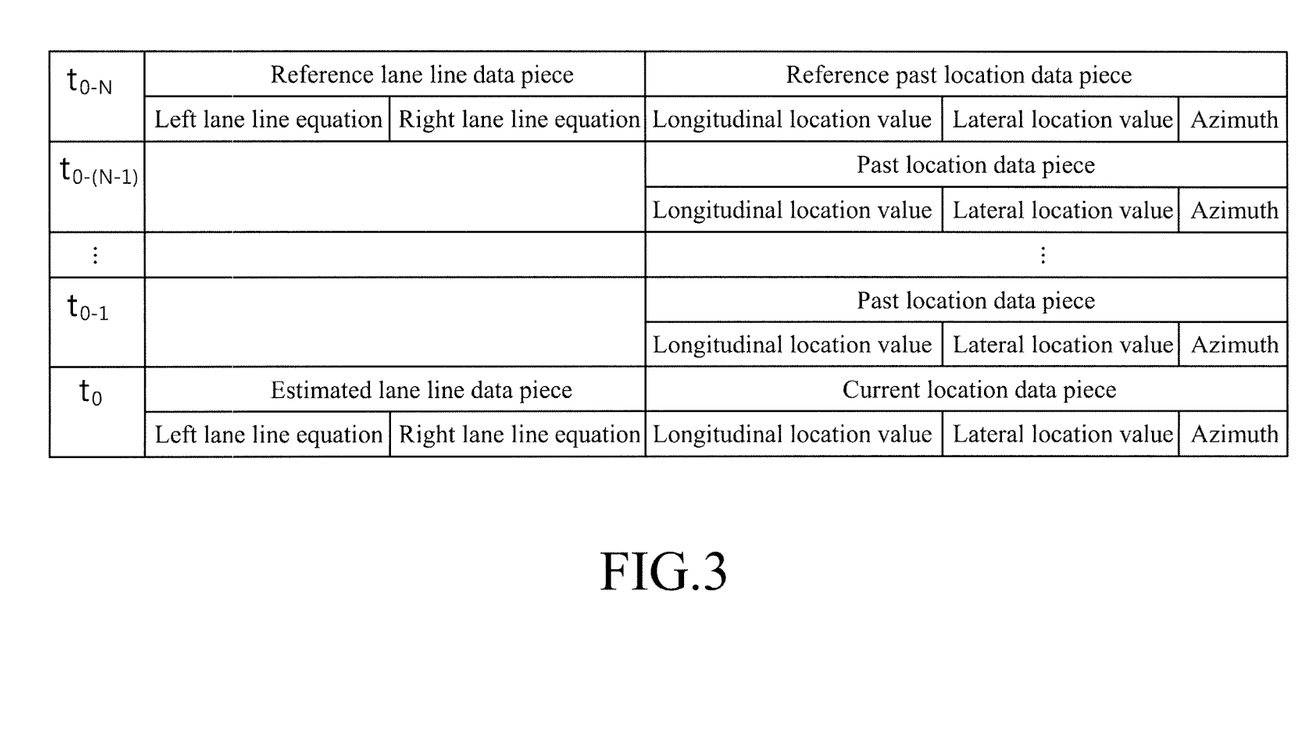
FIG. 3 is a table illustrating data stored in a storage unit of the embodiment of the lane tracking system.

Referring to FIG. 3, the storage unit 4, which may be a non-volatile memory device, such as a hard disk drive, a solid state drive, a flash memory device, etc., stores a reference lane line data piece, an estimated lane line data piece, a plurality of past location data pieces, and a current location data piece. The reference lane line data piece is generated based on an image of the lane 200 that was captured at a reference past time point ($t_{0-N}$) by the lane detection module 1. It is noted that the generation of the reference lane line data piece occurs for example, 100 ms after the reference past time point ($t_{0-N}$) in view of the time required for image processing. The estimated lane line data piece was generated previously and corresponds to a current time point ($t_0$). The past location data pieces include a reference past location data piece that corresponds to the vehicle location at the reference past time point ($t_{0-N}$). The current location data piece corresponds to the vehicle location at the current time point ($t_0$). Each of the past location data piece(s) other than the reference past location data piece corresponds to the vehicle location at a respective one of one or more past time points ($t_{0-1}, \ldots, t_{0-(N-1)}$) that are between the reference past time point ($t_{0-N}$) and the current time point ($t_0$) and that are equidistantly separated by the unit time length. For example, the past time point ($t_{0-1}$) is prior to the current time point ($t_0$) by one unit time length, the past time point ($t_{0-2}$) is prior to the past time point ($t_{0-1}$) by one unit time length, and so on. Accordingly, the reference past time point ($t_{0-N}$) is prior to the current time point ($t_0$) by a number (N) of the unit time lengths, where N is a positive integer. In this embodiment, each of the reference lane line data piece and the estimated lane line data piece includes a left lane line equation and a right lane line equation, and each of the past location data pieces and the current location data piece includes a longitudinal location value, a lateral location value, and an azimuth.

The processing unit 5 is electrically coupled to the lane detection module 1 for receiving the lane line data piece, is electrically coupled to the inertial measurement unit 2 for receiving the inertial measurement results, is electrically coupled to the motion sensing unit 3 for receiving the vehicle motion information, and is electrically coupled to the storage unit 4 for storing data received thereby in the storage unit 4 and for reading data stored in the storage unit 4. The processing unit 5 is a hardware device which may also be called, for example, a central processing unit (CPU), a controller, a processor, or the like. It is noted that, in this embodiment, all the data stored in the storage unit 4 are obtained by the processing unit 5 repeatedly performing an embodiment of the lane tracking method according to this disclosure, which will be described hereinafter, and are stored in the storage unit 4 by the processing unit 5.

Figure 4:
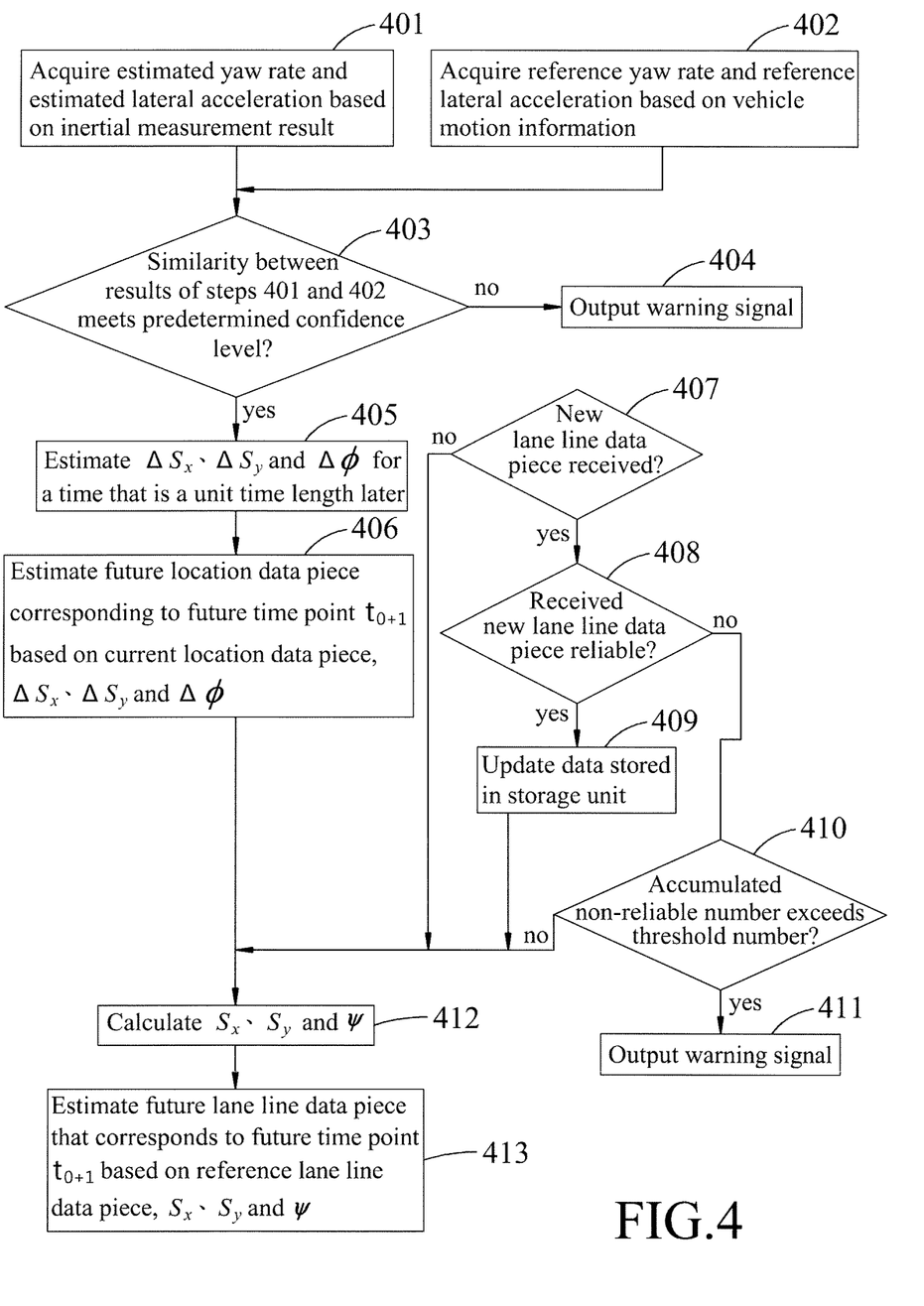
FIG. 4 is a flow chart illustrating steps of an embodiment of the lane tracking method according to this disclosure.

Referring to FIGS. 2 and 4, and also FIGS. 3 and 5-7, the embodiment of the lane tracking method according to this disclosure will be described to show how to estimate a future lane line data piece that corresponds to a future time point ($t_{0+1}$) for the autonomous vehicle 300.

In step 401, the processing unit 5 acquires an estimated yaw rate and an estimated lateral acceleration that correspond to the current time point ($t_0$) based on the inertial measurement results (i.e., the angular speed and the acceleration of the autonomous vehicle 300) measured and generated/outputted by the inertial measurement unit 2 at the current time point ($t_0$). In this embodiment, the processing 5 uses a Kalman filter to filter out noises of the measured angular speed and acceleration, and then uses the Kalman filter to perform estimation based on the angular speed and acceleration of which the noises have been filtered out, so as to obtain the estimated yaw rate and the estimated lateral acceleration. Since the Kalman filter is known in the art, details thereof are omitted herein for the sake of brevity.

In step 402, the processing unit 5 acquires a reference yaw rate and a reference lateral acceleration that correspond to the current time point ($t_0$) based on the vehicle motion information that is sensed and generated/outputted by the motion sensing unit 3 at the current time point ($t_0$). In this embodiment, the processing unit 5 calculates the reference yaw rate ($\hat{\gamma}$) and the reference lateral acceleration ($\hat{a}_y$) based on the steering angle ($\delta_{sw}$) and the vehicle speed ($V_x$) of the vehicle motion information, and a steering ratio (N), an understeering coefficient ($K_{us}$) and a wheelbase (L) of the autonomous vehicle 300 according to equations (3) and (4) that follow:

$$\hat{\gamma} = \delta_f \cdot V_x / (L + K_{us} \cdot V_x^2) \quad (3)$$

$$\hat{a}_y = \hat{\gamma} \cdot V_x = \delta_f \cdot V_x^2 / (L + K_{us} \cdot V_x^2) \quad (4),$$

where $\delta_f$ is a turn of front wheel (in degrees) and $\delta_f = \delta_{sw}/N$. In another embodiment, the processing unit calculates the reference yaw rate ($\hat{\gamma}$) and the reference lateral acceleration ($\hat{a}_y$) based on the vehicle speed ($V_x$), the wheel speed of the rear right wheel ($v_{rr}$) and the wheel speed of the rear left wheel ($v_{rl}$) of the vehicle motion information, and a rear track width ($S_r$) of the autonomous vehicle 300 according to equations (5) and (6) that follow:

$$\hat{\gamma} = (V_{rr} - V_{rl}) / S_r \quad (5)$$

$$\hat{a}_y = \hat{\gamma} \cdot V_x = V_x (V_{rr} - V_{rl}) / S_r \quad (6)$$

In yet another embodiment, the processing unit 5 calculates the reference yaw rate ($\hat{\gamma}$) and the reference lateral acceleration ($\hat{a}_y$) based on the turn of front wheel ($\delta_f$) and the wheel speed of a front right wheel ($v_{fr}$) and the wheel speed of a front left wheel ($v_{fl}$) of the vehicle motion information according to equations (7) and (8) that follow:

$$\hat{\gamma} = (V_{fr} - V_{fl})/S_f \cos(\delta_f) \tag{7}$$

$$\hat{a}_y = \hat{\gamma} \cdot V_x = V_x \cdot (V_{fr} - V_{fl})/S_f \cos(\delta_f) \tag{8}$$

After steps 401 and 402, the processing unit 5 may use, for example, a two sample T-test to determine whether a similarity between the estimated yaw rate and the reference yaw rate is at least a first predetermined confidence level and whether a similarity between the estimated lateral acceleration and the reference lateral acceleration is at least a second predetermined confidence level (step 403). In this embodiment, both of the first predetermined confidence level and the second predetermined confidence level are 95%, but this disclosure is not limited to such. The flow goes to step 405 when the determination is affirmative, and goes to step 404 when otherwise, which means that the inertial measurement result is not reliable. In step 404, the processing unit 5 outputs a warning signal that indicates abnormality of the inertial measurement unit 2 to an external control system (not shown), so that the external control system can follow up on this matter.

Figure 5:
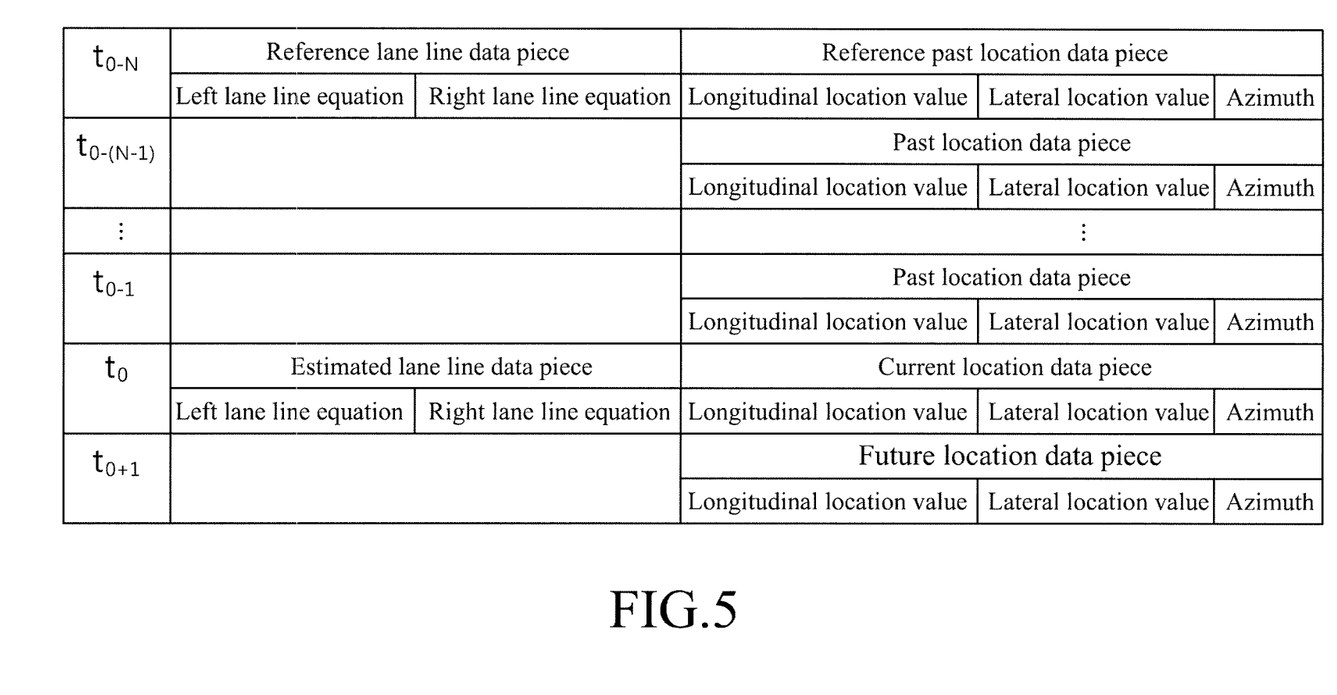
FIG. 5 is a table illustrating data stored in a storage unit of the embodiment after step 406 of the embodiment of the lane tracking method.

In step 405, the processing unit 5 estimates a longitudinal displacement ($\Delta s_x$), a lateral displacement ($\Delta s_y$) and an azimuth variation ($\Delta\phi$) that correspond to a time the unit time length (e.g., 10 ms) later than the current time point ($t_0$) (i.e., the future time point ($t_{0+1}$)), based on the estimated yaw rate and the estimated lateral acceleration. Then, the processing unit 5 calculates a future location data piece that corresponds to the vehicle location at the future time point ($t_{0+1}$) based on the current location data piece, the longitudinal displacement ($\Delta s_x$), the lateral displacement ($\Delta s_y$) and the azimuth variation ($\Delta\phi$), and stores the future location data piece in the storage unit 4 (step 406). The future location data piece includes a longitudinal location value, a lateral location value and an azimuth, as shown in FIG. 5. After step 406, the flow goes to step 412.

It is noted that, during steps 401 to 406, the processing unit 5 may determine whether a new lane line data piece is received at the current time point ($t_0$) from the lane detection module 1 (step 407). If a new lane line data piece received when step 406 is finished, the data stored in the storage unit 4 may be updated prior to performing step 412, so that step 412 can be performed using the updated data. Upon determining that a new lane line data piece, which is generated at the current time point ($t_0$) by the image processor 12 based on an image of the lane 200 captured by the CCD image sensor 11 at one of the past time points (e.g., $t_{0-10}$), is received at the current time point ($t_0$) in step 407, the processing unit 5 determines whether the new lane line data piece is reliable (step 408) based on the estimated lane line data piece and a predetermined reference condition that relates to an image sensing specification (e.g., image sensing resolution) of the CCD image sensor 11, so as to check if the lane detection module 1 works normally.

In this embodiment, the image sensing specification defines a farthest longitudinal location and a nearest longitudinal location between which precision of image sensing by the CCD image sensor 11 is reliable. The predetermined reference condition includes a first difference threshold related to a width of a detected lane at the nearest longitudinal location, a second difference threshold related to a width of the detected lane at the farthest longitudinal location, a first deviation threshold related to a central line of the detected lane at the nearest longitudinal location, and a second deviation threshold related to the central line of the detected lane at the farthest longitudinal location. In one example, the farthest longitudinal location is 25 meters from the vehicle location, a nearest longitudinal location is 15 meters from the vehicle location, the first difference threshold and the second difference threshold are both 0.5 meters, and the first deviation threshold and the second deviation threshold are both 0.1 meters, but this disclosure is not limited in this respect.

In step 408, the processing unit 5 calculates, based on the estimated lane line data piece, a first width value representing a width of the lane 200 at the nearest longitudinal location, a first location value representing a lateral location of a central line of the lane 200 at the nearest longitudinal location, a second width value representing a width of the lane 200 at the farthest longitudinal location, and a second location value representing a lateral location of the central line of the lane 200 at the farthest longitudinal location. The processing unit 5 also calculates, based on the new lane line data piece, a third width value representing the width of the lane 200 at the nearest longitudinal location, a third location value representing the lateral location of the central line of the lane 200 at the nearest longitudinal location, a fourth width value representing the width of the lane 200 at the farthest longitudinal location, and a fourth location value representing the lateral location of the central line of the lane 200 at the farthest longitudinal location. Then, the processing unit 5 calculates a first difference between the first width value and the third width value, a second difference between the second width value and the fourth width value, a third difference between the first location value and the third location value, and a fourth difference between the second location value and the fourth location value. In this embodiment, the processing unit 5 determines whether the new lane line data piece is reliable by determining whether the first difference is not greater than the first difference threshold, whether the second difference is not greater than the second difference threshold, whether the third difference is not greater than the first deviation threshold, and whether the fourth difference is not greater than the second deviation threshold. When all of the abovementioned conditions are satisfied, i.e., the first difference is not greater than the first difference threshold, the second difference is not greater than the second difference threshold, the third difference is not greater than the first deviation threshold, and the fourth difference is not greater than the second deviation threshold, the processing unit 5 determines that the new lane line data piece is reliable, which also means that the lane detection module 1 works normally, and the flow goes to step 409. Otherwise, the flow goes to step 410.

For example, it is assumed that the estimated lane line data piece includes a left lane line equation (equation (9)) and a right lane line equation (equation (10)) of:

$$y'_{L1} = f'_{L1}(x) = A'_{L1}x^3 + B'_{L1}x^2 + C'_{L1}x + D'_{L1} \tag{9}$$

$$y'_{R1} = f'_{R1}(x) = A'_{R1}x^3 + B'_{R1}x^2 + C'_{R1}x + D'_{R1} \tag{10},$$

and the new lane line data piece includes a left lane line equation (equation (11)) and a right lane line equation (equation (12)) of:

$$y'_L = f'_L(x) = A'_L x^3 + B'_L x^2 + C'_L x + D'_L \tag{11}$$

$$y'_R = f'_R(x) + A'_R x^3 + B'_R x^2 + C'_R x + D'_R \tag{12}$$

Following the previously mentioned example where the farthest longitudinal location is 25 meters, the nearest longitudinal location is 15 meters, the first difference threshold and the second difference threshold are both 0.5 meters, and the first deviation threshold and the second deviation threshold are both 0.1 meters, the first width value (W1), the third width value (W3), the first location value (Y1) and the third location value (Y3) can be acquired by applying x=15 to equations (9) to (12), where W1=f'$_{L1}$(15)−f'$_{R1}$(15), W3=f'$_L$(15)−f'$_R$(15), Y1=(f'$_{L1}$(15)+f'$_{R1}$(15))/2, and Y3=(f'$_L$(15)+f'$_R$(15))/2. Similarly, the second width value (W2), the fourth width value (W4), the second location value (Y2) and the fourth location value (Y4) can be acquired by applying x=25 (meters) to equations (9) to (12), where W2=f'$_{L1}$(25)−f'$_{R1}$(25), W4=f'$_L$(25)−f'$_R$(25), Y2=(f'$_{L1}$(25)+f'$_{R1}$(25))/2, and Y4=(f'$_L$(25)+f'$_R$(25))/2. Then, the first difference (D1), the second difference (D2), the third difference (D3) and the fourth difference (D4) can be acquired, where D1=|W1−W3|, D2=|W2−W4|, D3=|Y1−Y3|, and D4=|Y2−Y4|. It is noted that the abovementioned values are represented in meters. If D1≤0.5, D2≤0.5, D3≤0.1 and D4≤0.1, the processing unit 5 determines that the new lane line data piece is reliable. If any one of the above inequalities is not satisfied, the processing unit 5 determines that the new lane line data piece is not reliable, which means that the lane detection module 1 may be temporarily invalid because the lane lines have deteriorated, are unclear or absent, or have abnormal color contrast due to variations in light condition.

In step 410 (i.e., the new lane line data piece is determined to be not reliable), the processing unit 5 checks whether an accumulated number of the new lane line data piece being determined to be not reliable (hereinafter also referred to as "accumulated non-reliable number") exceeds a threshold number (e.g., 7). When affirmative, the flow goes to step 411, where the processing unit 5 outputs a warning signal that indicates abnormality of the lane detection module 1 to the external control system, so that the external control system can follow up on this matter. Otherwise, the flow goes to step 412.

Figure 6:
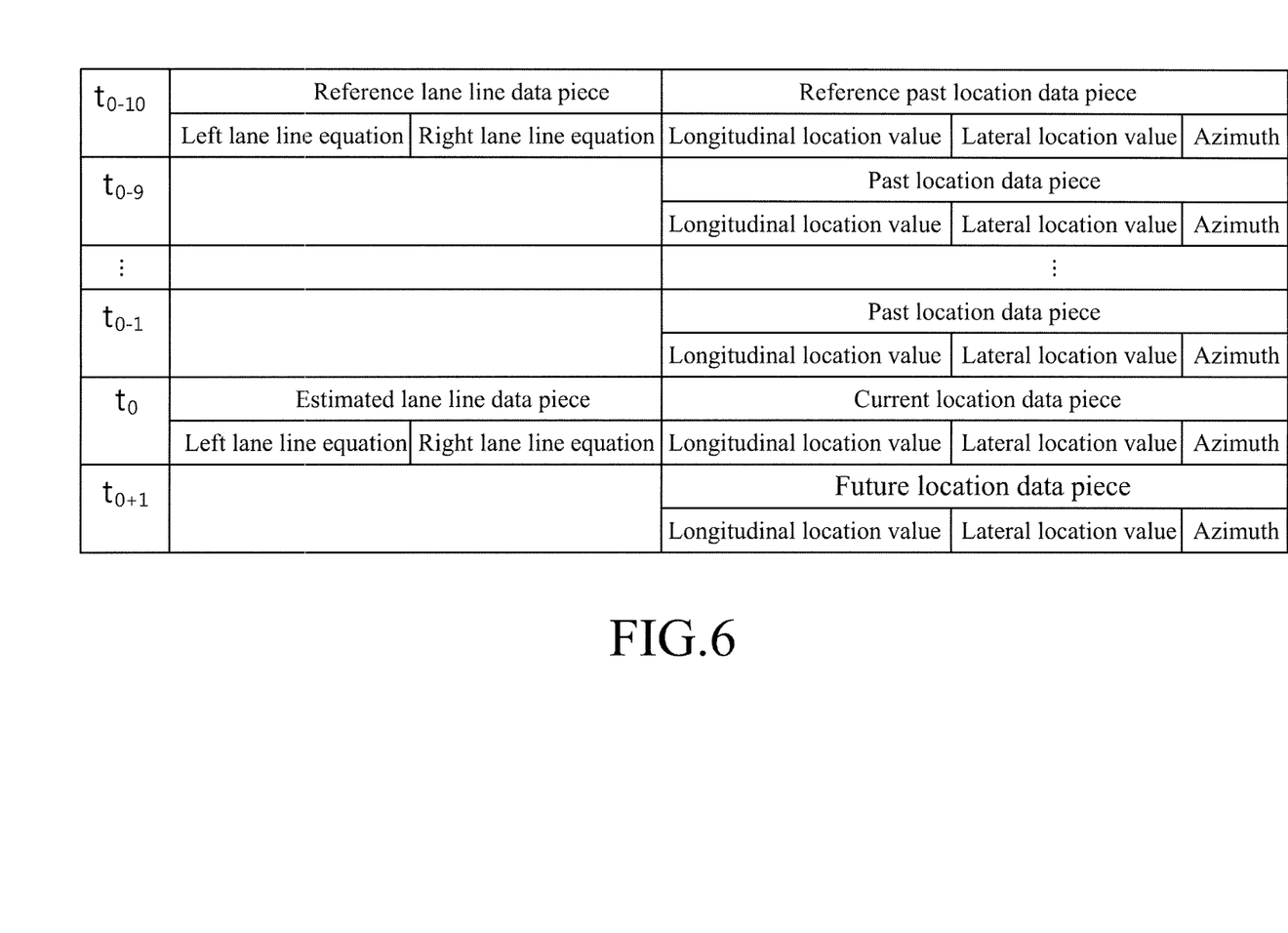
FIG. 6 is a table illustrating data stored in a storage unit of the embodiment after step 409 of the embodiment of the lane tracking method.

In step 409 (i.e., the new lane line data piece is determined to be reliable), the processing unit 5 updates the reference lane line data piece to the new lane line data piece (i.e., takes the new lane line data piece as the reference lane line data piece), and updates the reference past location data piece to one of the past location data pieces that corresponds to one of the past time points at which the image of the lane 200 corresponding to the new lane line data piece was captured (i.e., takes the one of the past location data pieces as the reference past location data piece). When the new lane line data piece is generated based on the image of the lane 200 captured at the past time point (t$_{0-10}$), the past location data piece that corresponds to the past time point (t$_{0-10}$) is stored as the reference past location data piece (also, the reference past time point is updated from t$_{0-N}$ to t$_{0-10}$, and the past location data pieces that correspond to the past time points prior to the past time point (t$_{0-10}$) may be removed, as shown in FIG. 6.

In step 412, the processing unit 5 calculates a total longitudinal displacement (S$_x$), a total lateral displacement (S$_y$) and a total azimuth variation (ψ) of the autonomous vehicle 300 from the reference past time point (t$_{0-N}$ or t$_{0-10}$) to the future time point (t$_{0+1}$) based on the reference past location data piece and the future location data piece. Specifically, when it is determined in step 407 that no new lane line data piece is received or it is determined in step 408 that the received new lane line data piece is not reliable and the accumulated non-reliable number does not exceed the threshold number, the processing unit 5 uses the non-updated reference past location data piece (e.g., corresponding to the (reference) past time point t$_{0-N}$, as shown in FIG. 5) and the future location data piece for calculation in step 412. On the other hand, when it is determined in step 407 that a new lane line data piece is received and it is determined in step 408 that the new lane line data piece is reliable, the processing unit 5 uses the reference past location data piece updated in step 409 (e.g., corresponding to the (reference) past time point t$_{0-10}$, as shown in FIG. 6) and the future location data piece for calculation in step 412.

Figure 7:
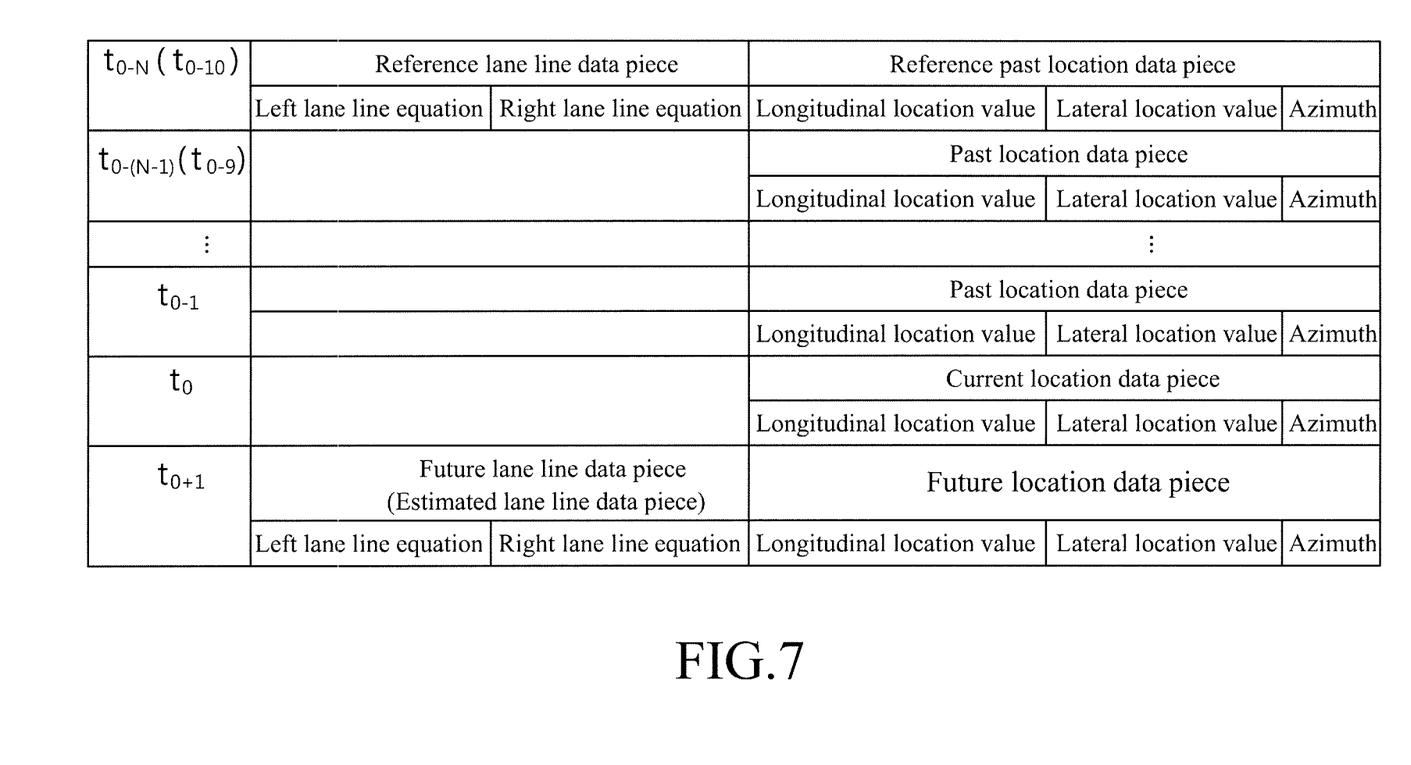
FIG. 7 is a table illustrating data stored in a storage unit of the embodiment after step 413 of the embodiment of the lane tracking method.

In step 413, the processing unit calculates/estimates a future lane line data piece based on the reference lane line data piece, the total longitudinal displacement (S$_x$), the total lateral displacement (S$_y$) and the total azimuth variation (ψ). The future lane line data piece calculated in step 413 would serve as an estimated lane line data piece that corresponds to the future time point (t$_{0+1}$). Then, the processing unit 5 stores the future lane line data piece in the storage unit 4 by, for example, overwriting the estimated lane line data piece that is originally stored in the storage unit 4 and that corresponds to the current time point (t$_0$), as shown in FIG. 7, but this disclosure is not limited in this respect.

For instance, referring to FIG. 8, the left lane line equation (equation (13)) and the right lane line equation (equation (14)) of the estimated lane line data piece are assumed to be:

$$y_{L1}=f_{L1}(x)=A_{L1}x^3+B_{L1}x^2+C_{L1}x+D_{L1} \quad (13)$$

$$y_{R1}=f_{R1}(x)=A_{R1}x^3+B_{R1}x^2+C_{R1}x+D_{R1} \quad (14),$$

and the vehicle location (the location of the reference point 301 of the autonomous vehicle 300 relative to the lane 200) at the future time point (t$_{0+1}$) with respect to the vehicle location at the reference time point (t$_{0-N}$ or t$_{0-10}$) can be represented by:

$$\begin{bmatrix} x' \\ y' \end{bmatrix} = \begin{bmatrix} \cos\psi & \sin\psi \\ -\sin\psi & \cos\psi \end{bmatrix}\begin{bmatrix} x-S_x \\ y-S_y \end{bmatrix} \quad (15)$$

where x' and y' cooperatively represent the vehicle location at the future time point (t$_{0+1}$), and x, y cooperatively represent the vehicle location at the reference time point (t$_{0-N}$ or t$_{0-10}$). By using an operation of matrix inverse, it can be derived from equation (15) that:

$$\begin{bmatrix} x \\ y \end{bmatrix} = \begin{bmatrix} \cos\psi & -\sin\psi \\ \sin\psi & \cos\psi \end{bmatrix}\begin{bmatrix} x' \\ y' \end{bmatrix} + \begin{bmatrix} S_x \\ S_y \end{bmatrix} \quad (16)$$

which shows that x is a function of x' (x=g(x',y')) and y is a function of y' (y=h(x',y')). Based on equations (13), (14), the left lane line equation (equation (17)) and the right lane line equation (equation (18)) of the future lane line data piece can be acquired according to:

$$y_{L2}=f_{L1}(g(x',y'))=A_{L2}x^3+B_{L2}x^2+C_{L2}x+D_{L2} \quad (17)$$

$$y_{R2}=f_{R1}(g(x',y'))=A_{R2}x^3+B_{R2}x^2+C_{R2}x+D_{R2} \quad (18)$$

Then, the processing unit 5 transmits the future lane line data piece to the external control system for the external control system to control lateral motion of the autonomous vehicle 300 based on the future lane line data piece. In the previous example where the refresh rate of the lane detection module 1 is 10 Hz and the refresh rates of the inertial measurement unit 2 and the motion sensing unit 3 are both 100 Hz, the lane tracking system 100 that implements the embodiment of the lane tracking method according to this disclosure promotes the refresh rate of the lane line data piece to ten times the refresh rate of the lane detection module 1 (from 10 Hz to 100 Hz).

In summary, the lane tracking system 100 of this disclosure uses the vehicle motion information to check the reliability of the estimated yaw rate and the estimated lateral acceleration that are estimated based on the inertial measurement result (the angular speed and the acceleration of the autonomous vehicle 300) outputted by the inertial measurement unit 2. Then, the estimated future location data piece and the reference lane line data piece are used to estimate the future lane line data piece at the future time point, thus promoting the refresh rate of the lane line data piece that contributes to lateral trajectory tracking, and effectively compensating for temporary failure of the lane detection module 1 (i.e., the condition of the new lane line data piece being determined to be not reliable). Accordingly, robustness and precision for lateral control can be improved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lane tracking method for use by an autonomous vehicle, being implemented by a processing unit, and comprising:
    (A) storing, into a storage unit, a reference lane line data piece, a plurality of past location data pieces, and a current location data piece, wherein:
        the reference lane line data piece is generated based on an image of a lane on which the autonomous vehicle is located, the image of the lane being captured at a reference past time point by a lane detection module mounted to the autonomous vehicle;
        the past location data pieces include a reference past location data piece that corresponds to a vehicle location, which refers to a location of a reference point of the autonomous vehicle relative to the lane, at the reference past time point;
        the current location data piece corresponds to the vehicle location at a current time point;
        each of the past location data piece(s) other than the reference past location data piece corresponds to the vehicle location at a respective one of one or more past time points that are between the reference past time point and the current time point and that are equidistantly separated by a unit time length; and
        each of the past location data pieces and the current location data piece includes a longitudinal location value, a lateral location value, and an azimuth;
    (B) acquiring an estimated yaw rate and an estimated lateral acceleration that correspond to the current time point based on an angular speed and an acceleration of the autonomous vehicle which are measured by an inertial measurement unit of the autonomous vehicle at the current time point, and acquiring a reference yaw rate and a reference lateral acceleration that correspond to the current time point based on vehicle motion information that is related to a steering wheel and wheels of the autonomous vehicle and that is sensed at the current time point by a motion sensing unit mounted to the autonomous vehicle;
    (C) upon determining that a similarity between the estimated yaw rate and the reference yaw rate is at least a first predetermined confidence level and that a similarity between the estimated lateral acceleration and the reference lateral acceleration is at least a second predetermined confidence level, estimating a longitudinal displacement, a lateral displacement and an azimuth variation that correspond to a time the unit time length later than the current time point, based on the estimated yaw rate and the estimated lateral acceleration;
    (D) calculating a future location data piece that corresponds to the vehicle location at a future time point based on the current location data piece, the longitudinal displacement, the lateral displacement and the azimuth variation, and storing the future location data piece in the storage unit, the future location data piece including a longitudinal location value, a lateral location value and an azimuth;
    (E) calculating a total longitudinal displacement, a total lateral displacement and a total azimuth variation of the autonomous vehicle from the reference past time point to the future time point based on the reference past location data piece and the future location data piece;
    (F) calculating a future lane line data piece based on the reference lane line data piece, the total longitudinal displacement, the total lateral displacement and the total azimuth variation, and storing the future lane line data piece in the storage unit; and
    (G) transmitting the future lane line data piece to a control system for the control system to control lateral motion of the autonomous vehicle based on the future lane line data piece.

2. The lane tracking method of claim 1, wherein step (A) further includes storing, in the storage unit, an estimated lane line data piece that was estimated previously and that corresponds to the current time point, said lane tracking method further comprising:
    (H) upon receipt of a new lane line data piece that is generated based on an image of the lane which was captured at one of the past time points by the lane detection module, determining whether the new lane line data piece is reliable based on the estimated lane line data piece and a predetermined reference condition that relates to an image sensing specification of the lane detection module; and
    (I) upon determining that the new lane line data piece is reliable, updating the reference lane line data piece and the reference past location data piece to the new lane line data piece and one of the past location data pieces that corresponds to said one of the past time points, respectively.

3. The lane tracking method of claim 2, wherein:
the image sensing specification defines a farthest longitudinal location and a nearest longitudinal location between which precision of image sensing is reliable;
the predetermined reference condition includes a first difference threshold related to a width of a detected lane at the nearest longitudinal location, a second difference threshold related to the width of the detected lane at the farthest longitudinal location, a first deviation threshold related to a central line of the detected lane at the nearest longitudinal location, and a second deviation threshold related to the central line of the detected lane at the farthest longitudinal location;
wherein step (H) includes:
calculating, based on the estimated lane line data piece, a first width value representing a width of the lane at the nearest longitudinal location, a first location value representing a lateral location of a central line of the lane at the nearest longitudinal location, a second width value representing a width of the lane at the farthest longitudinal location, and a second location value representing a lateral location of the central line of the lane at the farthest longitudinal location;
calculating, based on the new lane line data piece, a third width value representing the width of the lane at the nearest longitudinal location, a third location value representing the lateral location of the central line of the lane at the nearest longitudinal location, a fourth width value representing the width of the lane at the farthest longitudinal location, and a fourth location value representing the lateral location of the central line of the lane at the farthest longitudinal location;
calculating a first difference between the first width value and the third width value, a second difference between the second width value and the fourth width value, a third difference between the first location value and the third location value, and a fourth difference between the second location value and the fourth location value; and
determining that the new lane line data piece is reliable when the first difference is not greater than the first difference threshold, the second difference is not greater than the second difference threshold, the third difference is not greater than the first deviation threshold, and the fourth difference is not greater than the second deviation threshold.

4. The lane tracking method of claim 1, wherein step (B) includes:
using a Kalman filter to filter out noises of the angular speed and the acceleration of the autonomous vehicle which are measured by the inertial measurement unit and to obtain the estimated yaw rate and the estimated lateral acceleration based on the angular speed and the acceleration of which the noises have been filtered out.

5. The lane tracking method of claim 1, wherein:
the vehicle motion information includes a steering angle and a vehicle speed; and
step (B) includes:
obtaining the reference yaw rate and the reference lateral acceleration based on the steering angle, the vehicle speed, and a steering ratio, an understeering coefficient and a wheelbase of the autonomous vehicle.

6. The lane tracking method of claim 1, wherein:
the vehicle motion information includes a vehicle speed, a wheel speed of a rear right wheel, and a wheel speed of a rear left wheel; and
step (B) includes:
obtaining the reference yaw rate and the reference lateral acceleration based on the vehicle speed, the wheel speed of the rear right wheel, the wheel speed of the rear left wheel, and a rear track width of the autonomous vehicle.

7. A lane tracking system for use by an autonomous vehicle, comprising:
a lane detection module mounted to the autonomous vehicle, and configured to continuously capture, at a detecting frequency, images of a lane on which of the autonomous vehicle is located, and to generate a lane line data piece for each image captured thereby;
an inertial measurement unit mounted to the autonomous vehicle, and configured to sense inertia of the autonomous vehicle and generate data of an angular speed and an acceleration of the autonomous vehicle;
a motion sensing unit mounted to the autonomous vehicle, and configured to sense motion of the autonomous vehicle and motions of a steering wheel and wheels of the autonomous vehicle, and to generate vehicle motion information;
a storage unit storing a reference lane line data piece, a plurality of past location data pieces, and a current location data piece, wherein:
the reference lane line data piece is generated based on an image of the lane captured at a reference past time point by said lane detection module;
the past location data pieces include a reference past location data piece that corresponds to a vehicle location, which refers to a location of a reference point of the autonomous vehicle relative to the lane, at the reference past time point;
the current location data piece corresponds to the vehicle location at a current time point;
each of the past location data piece(s) other than the reference past location data piece corresponds to the vehicle location at a respective one of one or more past time points that are between the reference past time point and the current time point and that are equidistantly separated by a unit time length; and
each of the past location data pieces and the current location data piece includes a longitudinal location value, a lateral location value, and an azimuth; and
a processing unit electrically coupled to said lane detection module, said inertial measurement unit, said motion sensing unit and said storage unit, and configured to
calculate an estimated yaw rate and an estimated lateral acceleration that correspond to the current time point based on the angular speed and the acceleration of the autonomous vehicle which are measured by said inertial measurement unit at the current time point,
calculate a reference yaw rate and a reference lateral acceleration that correspond to the current time point based on the vehicle motion information that is related to the steering wheel and the wheels of the autonomous vehicle and that is sensed by said motion sensing unit at the current time point, estimate, upon determining that a similarity between the estimated yaw rate and the reference yaw rate is at least a first predetermined confidence level and that a similarity between the estimated lateral acceleration and the reference lateral acceleration is at least a second predetermined confidence level, a longitudinal displacement, a lateral displacement and an azimuth variation that correspond to a time the unit time length later than the current time point, based on the estimated yaw rate and the estimated lateral acceleration, calculate a future location data piece that corresponds to the vehicle location at a future time point based on the current location data piece, the longitudinal displacement, the lateral displacement and the azimuth variation, store the future location data piece in said storage unit, wherein the future location data piece includes a longitudinal location value, a lateral location value and an azimuth, calculate a total longitudinal displacement, a total lateral displacement and a total azimuth variation of the autonomous vehicle from the reference past time point to the future time point based on the reference past location data piece and the future location data piece, calculate a future lane line data piece based on the reference lane line data piece, the total longitudinal displacement, the total lateral displacement and the total azimuth variation, store the future lane line data piece in said storage unit, and transmit the future lane line data piece to a control system for the control system to control lateral motion of the autonomous vehicle based on the future lane line data piece.

8. The lane tracking system of claim 7, wherein said storage unit further stores an estimated lane line data piece that was estimated previously and that corresponds to the current time point;

wherein said processing unit is further configured to determine, upon receipt of a new lane line data piece that is generated based on an image of the lane which was captured at one of the past time points by said lane detection module, whether the new lane line data piece is reliable based on the estimated lane line data piece and a predetermined reference condition that relates to an image sensing specification of said lane detection module, and update, upon determining that the new lane line data piece is reliable, the reference lane line data piece and the reference past location data piece to the new lane line data piece and one of the past location data pieces that corresponds to said one of the past time points, respectively.

9. The lane tracking system of claim 8, wherein:

the image sensing specification defines a farthest longitudinal location and a nearest longitudinal location between which precision of image sensing is reliable;

the predetermined reference condition includes a first difference threshold related to a width of a detected lane at the nearest longitudinal location, a second difference threshold related to the width of the detected lane at the farthest longitudinal location, a first deviation threshold related to a central line of the detected lane at the nearest longitudinal location, and a second deviation threshold related to the central line of the detected lane at the farthest longitudinal location;

said processing unit is further configured to calculate, based on the estimated lane line data piece, a first width value representing a width of the lane at the nearest longitudinal location, a first location value representing a lateral location of a central line of the lane at the nearest longitudinal location, a second width value representing a width of the lane at the farthest longitudinal location, and a second location value representing a lateral location of the central line of the lane at the farthest longitudinal location, calculating, based on the new lane line data piece, a third width value representing the width of the lane at the nearest longitudinal location, a third location value representing the lateral location of the central line of the lane at the nearest longitudinal location, a fourth width value representing the width of the lane at the farthest longitudinal location, and a fourth location value representing the lateral location of the central line of the lane at the farthest longitudinal location, calculate a first difference between the first width value and the third width value, a second difference between the second width value and the fourth width value, a third difference between the first location value and the third location value, and a fourth difference between the second location value and the fourth location value, and determine that the new lane line data piece is reliable when the first difference is not greater than the first difference threshold, the second difference is not greater than the second difference threshold, the third difference is not greater than the first deviation threshold, and the fourth difference is not greater than the second deviation threshold.

10. The lane tracking system of claim 7, wherein said processing unit is configured to use a Kalman filter to filter out noises of the angular speed and the acceleration of the autonomous vehicle which are measured by the inertial measurement unit and to obtain the estimated yaw rate and the estimated lateral acceleration based on the angular speed and the acceleration of which the noises have been filtered out.

11. The lane tracking system of claim 7, wherein:

the vehicle motion information includes a steering angle and a vehicle speed; and said processing unit is configured to obtain the reference yaw rate and the reference lateral acceleration based on the steering angle, the vehicle speed, and a steering ratio, an understeering coefficient and a wheelbase of the autonomous vehicle.

12. The lane tracking system of claim 7, wherein:

the vehicle motion information includes a vehicle speed, a wheel speed of a rear right wheel, and a wheel speed of a rear left wheel; and said processing unit is configured to obtain the reference yaw rate and the reference lateral acceleration based on the vehicle speed, the wheel speed of the rear right wheel, the wheel speed of the rear left wheel, and a rear track width of the autonomous vehicle.

* * * * *